Patented Dec. 19, 1950

2,534,228

UNITED STATES PATENT OFFICE 2,534,228

METHOD OF PRODUCING SUBSTANTIALLY COLORLESS PROTEINS FROM OLEAGINOUS SEED MATERIAL

Francis E. Calvert, Cincinnati, Ohio, assignor to The Drackett Company, Cincinnati, Ohio, a corporation of Ohio No Drawing. Application September 22, 1947, Serial No. 775,565

3 Claims. (Cl. 260—123.5)

This invention relates to an improved process for the treatment of proteinaceous materials of the type found in oleaginous seeds, and has for its principal object the preparation of a white or substantially white vegetable protein and of products and compositions containing such protein.

Protein substances have valuable and extensive application in many industrial processes. They are used in the paper industry as the basis of a coating or size for paper, in the plastics industry generally, and in the fabrics field in the form of synthetic fibers. In many of these fields, it is essential that the protein employed be substantially free from color, and the difficulty of producing a light colored or white protein from vegetable sources has proved a serious limitation on the extent of use of such protein.

Thus the final color of dry proteins prepared from vegetable sources may vary from black to light yellow, the more common intermediate shades being dark brown, red, red-brown, and light brown. It can be shown that in protein obtained by existing methods, the color depends primarily upon the particular seeds from which the protein is isolated, and upon the method of isolation. As heretofore produced, most of the vegetable protein is unsatisfactory in the preparation of paper coating, sizings for light colored wall papers, button stock, and for use in other fields in which the final product must be light in color, unless heavily pigmented with white pigments. Pigmentation, however, results in reduction in strength and transparency of the product, and is therefore undesirable.

I have discovered that the coloration observed in such proteins is largely the result of oxidation which occurs in the normal processing of the vegetable material to obtain the protein substance therefrom, the native protein in the bean or seed being usually nearly white or colorless. The oxidation of the protein is a biological phenomenon, catalyzed by oxidative enzymes which are present in the plants or seeds. Apparently this biological oxidation is a protective mechanism developed by the plant to protect it against mechanical injury, the several phases of the process being essentially as follows:

1. Mechanical injury liberates oxidizing enzymes and a chromogenic substance.

2. The oxidizing enzymes, utilizing oxygen from the air or water contained in the vegetable substance, oxidize the chromogenic substance to produce a quinone.

3. The quinone (probably an ortho-quinone) acts as an antiseptic to kill bacteria at the point of injury, thus preventing decay.

4. The quinone simultaneously tans the protein at the point of exposure to produce a mechanical barrier in the nature of scar tissue, preventing further entrance of bacteria.

5. The quinone polymerizes to an insoluble brown pigment.

It should be noted that in the normal processing of protein-yielding vegetable raw materials for the production of protein, the raw materials are subjected to mechanical injury and the formation of a darkly colored product is thus immediately initiated.

The foregoing facts are pointed out in my prior application for U. S. Letters Patent Serial No. 707,973, filed November 5, 1946, now Patent No. 2,451,659. It is therein concluded that three factors contribute to the formation of color in vegetable proteins during processing of the source material, namely oxidizing enzymes, oxygen, and chromogenic or aromatic substances, and that if one of these factors is absent, or chemically or physically inhibited or repressed, the protein should be substantially white. It is further asserted that it is impossible to remove completely any one of these factors without destroying or harming the proteins, but that if two of these factors are isolated as completely as is practicable, the resulting protein is substantially without color.

It is also pointed out in my copending application Serial No. 775,564, filed concurrently herewith, that enzyme reaction is inhibited by acid extraction of protein from its vegetable source. Thus when the pH of the raw material is lowered to a value below 2.0, the acid itself acts as an enzyme inhibitor, and substantially colorless or white protein may be obtained with the addition of a blanketing agent only, no further enzyme inhibitor being required.

The present application is predicated on the discoveries set forth in the aforementioned copending applications and on the further discovery that outstanding results may be achieved by the employment of bisulfites of the metals of group II of the periodic table, the readily soluble bisulfites of magnesium, calcium, zinc, strontium and barium being especially effective. Proteins isolated from soybean with strontium or magnesium bisulfite in the presence of a blanketing agent are the lightest in color of any proteins examined by me.

It can be shown that the material which is oxidized by the enzyme to produce color in protein, a chromogen, is a phenolic compound, and that phenolic substances when combined with the metals of group II are incapable of being oxidized by enzymes. Possibly this is due to their insolubility and the blocking of the phenolic hydroxyl groups. Thus the bisulfites of group II metals, when used in the practice of my invention, function as protein solvents, enzyme inhibitors, and chromogen insolubilizers. Doubtless the ability of these bisulfites to act in several capacities accounts, at least in large part, for their effectiveness in the production of a white and relatively stable protein. I prefer to employ, in conjunction with the bisulfites, an oxygen excluding or blanketing agent of the class described in the aforesaid applications, capable of forming an adsorption compound with protein to exclude oxygen from contact with the protein molecule. However, results distinctly superior to conventional extraction methods can be obtained by the use of bisulfites of group II metals, even in the absence of a blanketing agent, the proteins so obtained being of very light color. Radium compounds are of no practical value for obvious reasons.

In contrast to the sulfites of group II metals, which are not soluble, bisulfites are readily soluble in water. Furthermore, they enable the extraction to be carried out at a pH of 2.0 or less if desired, so that by their use I may combine the practices set forth in both of the aforesaid applications. They are capable of combining readily with phenols, whereby the chromogens are rendered insoluble and incapable of forming color. Proteins prepared with these bisulfites are readily soluble in alkali for practical uses, even though extracted at a pH of the order of 2.0.

It is accordingly an object of the present invention to produce a white or nearly colorless protein by the extraction of the protein from oleaginous seed material, such as the soybean, peanut, cottonseed, and the like by means of, or in the presence of, a bisulfite of a metal of group II, and preferably, strontium or magnesium bisulfite, whereby enzyme activity is minimized. In the preferred practice of the invention, an oxygen excluding or blanketing agent is also present during the extraction; an additional enzyme inhibiting agent may also be employed. As an adjunct to this treatment, the invention contemplates the removal of chromogenic substances from the vegetable source, for instance by extraction from the raw material with lower primary alcohols such as methanol or ethanol. Owing, however to the effectiveness of the bisulfites in blocking color development, such added and expensive precautions are usually unnecessary.

Preferred methods of practicing the invention are described in the following specific examples, it being understood that these examples are merely representative of typical procedure and that the practice of the invention is not necessarily limited to the preferred conditions set forth therein.

*Example I*

This example represents the general procedure followed in the succeeding examples, the conditions prescribed in Example I being followed excepting where the contrary is indicated.

1. A bath was prepared consisting of 3,000 ml. water at 45° C., a selected amount of the appropriate compound of alkaline earth metal or other bivalent metal, known to form bisulfites under the conditions used, was added, and sulfur dioxide bubbled into the solution until a pH 1.8-2.6 was obtained.

2. Into this bath were placed 200-250 grams of proteinaceous vegetable material and the mixture agitated for about 30 minutes by a mechanical stirrer. The temperature was maintained at 45° C. during this procedure.

3. The spent material was then removed from the extraction liquor by straining through cloth.

4. By centrifuging the strained liquor was further clarified.

5. The centrifuged liquor was then heated to 75° C. and sodium hydroxide or other alkali added to adjust the pH to 4.2-4.8. A slight variation of this range may be used, but this range is more desirable for yield and handling properties of the resulting protein curd.

6. The curd precipitated by the alkali was then removed from the liquor by filtration, and 7. Dried in an air oven at 45° C.

*Example II*

1. Two hundred (200) grams of soybean flakes substantially oil free were used as a source of portein. These flakes were not at any time subjected to temperatures above 60° C. They were stored in hexane to prevent exposure to oxygen until needed, at which time the hexane was removed by evaporation in air at room temperature.

2. The hexane free flakes were covered with varnish makers and painters naphtha which was drained off, leaving them saturated with the solvent.

3. The naphtha wet flakes were then placed in a bath consisting of 3,000 ml. water, 1.3 grams ammonium thiocyanate, 5 grams calcium hydroxide, and enough sulfur dioxide to give a pH of 3.0.

4. After adding the flakes, sulfur dioxide was added to give a pH of 2.6. The procedure of Example I was then followed except that the strained liquor was not centrifuged.

5. Precipitation of the curd was accomplished by adding sodium hydroxide to give a pH of 4.6. The resulting protein was opaque. The color was white with a very faint hint of yellow. The protein was very soluble in dilute alkali which is unusual for a protein isolated at a pH below its isoelectric point. Upon redissolving and reprecipitating with acid, filtering, and drying the protein remained a light cream color. The protein solvent in this example was calcium bisulfite, additional enzyme inhibitor ammonium thiocyanate, and the blanketing agent varnish makers' and painters' naphtha.

*Example III*

The procedure in Example II was repeated, eliminating the blanketing agent, and adding the centrifuging step given in Example I. The pH during extraction was 2.2 and, after precipitation by sodium hydroxide, was 4.7. The protein was a very light yellow color, readily soluble in dilute alkali and had good adhesive strength when used in a paper coating formula.

*Example IV*

Example II was repeated using octyl alcohol instead of varnish makers' and painters' naphtha, 3.8 grams of magnesium hydroxide were used instead of calcium hydroxide, ammonium thiocyanate was eliminated, and the strained liquor was centrifuged. The pH during extraction was 1.9. Precipitation was accomplished by adding potassium hydroxide to give a pH of 4.1. The resulting protein was opaque, white, and very friable. The protein solvent in this example was magnesium bisulfite. The blanketing agent was octyl alcohol.

*Example V*

Example IV was repeated eliminating the use of any blanketing agent, adding ammonium thiocyanate to the protein solvent solution, and eliminating the centrifuging operation. The pH during extraction was 2.4. Sodium hydroxide was used to precipitate the protein curd at a pH of 4.32. The rest of the procedure was the same as given in the general method of Example I. The protein was the glassy type, very light brownish yellow in color, and was soluble in dilute alkali.

*Example VI*

Example II was repeated using lauryl alcohol instead of varnish makers' and painters' naphtha, 4.3 grams of strontium carbonate instead of calcium hydroxide, eliminating the use of ammonium thiocyanate, and adding the clarification step by centrifuging. The pH during extraction was 2.05. Precipitation was accomplished by adding sodium hydroxide to give a pH of 4.6. The lauryl alcohol was removed from the dried protein by petroleum ether. The resulting protein was opaque, very bright white in color, and very friable. In this example the protein solvent was strontium bisulfite, and the blanketing agent was lauryl alcohol.

*Example VII*

Example VI was repeated eliminating the lauryl alcohol and using 1.3 grams ammonium thiocyanate in the protein solvent solution. The pH during extraction was 2.45. Sodium hydroxide was used to precipitate the protein at a pH of 4.48. The protein obtained was the glassy type, and was a very light yellow in color. The protein solvent was strontium bisulfite and the additional enzyme inhibitor was ammonium thiocyanate.

*Example VIII*

Two hundred (200) grams of soybean flakes as described in step 1 of Example II were placed in a bath composed of 3,000 ml. water at 45° C., 1.3 grams ammonium thiocyanate, 2 grams zinc hydroxide, and enough sulfur dioxide to cause the zinc hydroxide to dissolve forming a clear solution. After adding the flakes, agitation was continued by mechanical stirrer and sulfur dioxide added until the pH was 2.2. The remainder of the process was the same as described in the general method of Example I, but eliminating centrifuging. Precipitation of the protein curd was accomplished by adding enough sodium hydroxide to give a pH of 4.4. The protein was of the glassy type, very slight yellow in color, and soluble in dilute alkali. Upon dissolving in alkali, re-precipitating by acid, and drying, the color was only very slightly darkened from the original. The protein solvent was zinc bisulfite, and the additional enzyme inhibitor was ammonium thiocyanate.

*Example IX*

The source of protein in this experiment was 200 grams of substantially oil free soybean flakes which were stored in hexane until just before using. The extraction agent was beryllium bisulfite and the blanketing material octyl alcohol. The hexane was removed from the 200 grams of soybean flakes by air drying in an open pan. After the hexane had evaporated the flakes were wet with an excess of octyl alcohol, allowed to stand 10 minutes, and excess drained off. The flakes were then placed in an aqueous bath composed of (a) 3,000 ml. water at 48° C., (b) 3.5 grams beryllium carbonate, and (c) sulfur dioxide to give a pH of 2.28. Five minutes after adding the flakes the pH was 2.42. After stirring 30 minutes the flakes were separated from the liquid by straining through cheesecloth, the liquor clarified by centrifuging and heated at 75° C. The protein was precipitated by adding sodium hydroxide to make pH of solution 4.60. The curd was removed by filtering, and dried in an air oven at 45° C. The protein when dry was the opaque type, white in color and very friable.

*Example X*

Two hundred (200) grams of soybean flakes, which had been stored in hexane until just before use, were freed of hexane by air drying. The flakes were placed in an aqueous bath consisting of (a) 3,000 ml. water at 48° C., (b) 5 grams calcium hydroxide, and (c) sulfur dioxide to make pH of bath 1.80. While stirring with mechanical stirrer more sulfur dioxide was added until pH was 2.20. At the end of 30 minutes stirring was discontinued and the flakes allowed to settle to the bottom of the beaker. The clear liquor was siphoned off the flakes through a cheesecloth covered funnel, heated to 75° C., and protein precipitated by adding sodium hydroxide to give a pH of 4.6. The curd was allowed to settle over night, excess liquor decanted, and the curd collected by filtration. After spreading on glass plates the filtered curd was dried in circulating air oven at 45° C. The protein was very light in color and was the glassy type.

While the lightest colored proteins are obtained when the blanketing agent is present during the entire period of the isolation procedure, material improvement may be effected by introducing the agent at any time during the process or even immediately prior to the drying of the protein curd, presence of the agent during the drying period being essential to its effective use. For this reason it is believed that the blanketing agents perform a function in addition to the exclusion of air or oxygen which may be briefly described as an antiaggregation effect, the formation of giant molecules by the joining of molecules during the drying period being retarded or prevented by the agent. A possible explanation of this function is as follows:

The wet proteins are highly swollen by water and have water between their molecules. As this water is removed the protein molecules attract each other through secondary forces and thus aggregate to large molecules. However, when a blanketing agent is present, this agent gradually enters the area occupied by the water as the water is removed, thus physically preventing the protein molecules from aggregating or packing together. The protein is then freed of practically all water by, for example, drying and thus becomes rigid. Removal of the blanketing agent by an organic solvent that is unable to swell the protein then leaves the protein in a distended low molecular weight condition containing many voids of molecular size like a sponge. This would be one way of explaining another effect observed, namely, that proteins prepared by my invention dissolve much more rapidly in protein solvents than porteins prepared by ordinary procedures.

In this connection it may be pointed out that by the practice of my invention, improved results other than in the whiteness of the protein are achieved. For instance, when protein prepared by conventional acid extraction methods is soaked in water for 30 minutes and then dissolved by the addition of caustic soda, a tremendous swelling occurs, finally resulting in a gel. In order to break down this gel, and obtain a thin solution, the protein must be heated and mechanically stirred. In contrast, protein prepared in accordance with the present invention, when similarly soaked in water and dissolved with caustic soda, swells momentarily and then almost immediately breaks down into a thin solution, without the aid of heat or mechanical agitation. It is believed that by the present process, the protein is brought to such physical condition that the alkali immediately dissolves the same without a prolonged swelling and gelation period, and that the blanketing agent is chiefly responsible for this result.

Substances which may be successfully employed as blanketing agents are quite numerous and vary widely in chemical and physical properties. Extensive experimentation shows that satisfactory blanketing agents are substances which may be defined as consisting essentially of liquid organic compounds having low solubility in water, capable of forming an adsorption compound with the protein or protein-chromogen complex, and by reason of this adsorption phenomenon effectively excluding oxygen from contact with the protein or protein-chromogen complex molecule. That an adsorption compound is formed appears reasonably certain from experimental data. For instance, if hexane is the blanketing agent, the isolated protein can be dried at 60° C. under reduced pressure for a period of time sufficient to insure the removal of all the hexane from a mechanical mixture. However, if the protein is then stored for a short period in a closed container, the characteristic odor of free hexane is developed in the container in a short time. It is believed that the molecules of the blanketing agent adhere to the protein molecules in an extremely thin layer and that the adsorption phenomenon accomplishes the following results:

1. Excludes oxygen.
2. Prevents molecular aggregation.
3. Possibly insulates that portion of the molecule which can combine with the oxidized chromogen or other substances.

In the following table are listed substances which are typical of various classes of chemical compounds, certain characteristics of each compound and the degree of protection afforded thereby being indicated.

*Blanketing agents tested with soy protein*

| | Effective protection | B. P., °C. | Solubility in water | Specific gravity |
|---|---|---|---|---|
| Esters: | | | | |
| Tributyl citrate | Complete | 233.5 (22 mm.) | Insoluble | 1.046 |
| Dibutyl phthalate | do | 230 | .04% | 1.048 |
| Dimethyl phthalate | do | 296 | .45% | 1.192 |
| Butyl lactate | do | 140–200 | 3.4% | .979 |
| Tributyl phosphate | do | 180 (25 mm) | .6% | .978 |
| Tri-octyl phosphate | do | | Insoluble | .962 |
| Ethyl acetate | None | 102–173 | 9.7% | .885 |
| Ethers: | | | | |
| Diethyl | None | 40 | 7.5% | .832 |
| Dibutyl | Complete | 142 | Slightly soluble | .784 |
| Diamyl | do | 190 | Insoluble | .774 |
| Open Chain Alcohols: | | | | |
| Ethanol | None | 78 | All proportions | .789 |
| n Butanol | do | 117 | 7.9% | .809 |
| n Amyl | 5% | 138 | 2.7% | .814 |
| 2 Pentanol 4 Methyl | 50% | 131.8 | 1.7% | .808 |
| n Hexanol | Complete | 157.2 | .59% | .820 |
| Capryl | do | 122 | .538% | .819 |
| Ethyl hexanol (octyl) | do | 183.5 | .10% | .834 |
| Lauryl | do | 37.6 (M. P.) | Insoluble | .830 |
| Hydrocarbons: | | | | |
| Petroleum ether | do | 36–40 | .036% | .626 |
| Hexane | do | 69 | .013% | .660 |
| Kerosene | do | | Insoluble | |
| Mineral oil | do | | do | |
| Benzene | do | 80 | .082% | .879 |
| Cyclohexane | do | 81.4 | Insoluble | .779 |
| Dry cleaners Naphtha | do | 93.98 | do | .742 |
| V. M. & P. Naphtha | do | 110–115.6 | do | .752 |
| Mineral spirits | do | 148.9–154.4 | do | .774 |
| Chlorinated hydrocarbons: | | | | |
| Ethylene dichloride | 50% | 83.5 | .92% | 1.257 |
| Carbon tetrachloride | Complete | 76–7 | .08% | 1.595 |
| Amines: | | | | |
| n Butyl | None | 77.8 | All proportions | .740 |
| n Hexyl | do | 132.7 | Slightly soluble | |
| Vegetable Oils: | | | | |
| Linseed | Complete | | Insoluble | |
| Cottonseed (bleached and refined) | do | | do | |
| Soybean | do | | do | |
| Miscellaneous: | | | | |
| Pine oil | do | | do | |
| Nitrobenzene | do | 211 | Very slightly | 1.205 |
| Cyclohexanol (Technical Grade) | do | 161.5 | 3.0% (approx.) | .945 |

An examination of the above list indicates that solubility in water is an important factor in determining the effectiveness of a compound as a blanketing agent, and that in general solubilities of less than 1% appear desirable; of the effective agents here listed, none has a solubility of more than 4%. All of the agents indicated above as effective in blanketing the protein may be substituted for those employed in the foregoing specific examples with good results.

Owing principally to the unusual effectiveness of the bisulfites of group II metals, satisfactory results are achieved, as is apparent from the foregoing examples, even though the pH value exceeds the preferred value of 2.0 during extraction, but should not substantially exceed 3.0. The temperature of the extracting solution is not critical; normal or slightly elevated temperature is satisfactory.

As is hereinbefore pointed out, the effect of the bisulfite in inhibiting enzyme activity tends to persist. However, as a matter of precaution I find it sometimes desirable to introduce, in addition to the bisulfite agent, one of the enzyme inhibiting agents employed in the practice of the invention described in my concurrently filed application, usually prior to or during the precipitation of the protein, as indicated in certain of the foregoing examples.

Enzyme inhibiting agents (when such are used as an adjunct to the bisulfites of the present invention) may be selected from widely varying chemical compounds, as is indicated by the following list, representative of various types of effected chemicals:

1. Hydrocyanic acid and soluble cyanides (NaCN, etc.).
2. Thiocyanic acid and soluble thiocyanates ($NH_4SCN$, etc.).
3. Hydrofluoric acid and soluble fluorides (NaF or $NH_4FHF$, etc.).
4. Phosphoric acid and soluble phosphates like sodium phosphates, sodium hexametaphosphate, tetrasodium pyrophosphate.
5. Hydrazoic acid and soluble azides ($NaN_3$, etc.).
6. Hydroxylamine, hydrazine, etc.
7. Thiourea.
8. Carbon monoxide.
9. Sodium diethyldithiocarbamate.
10. Ascorbic acid.
11. Cysteine and salts.
12. Hydrogen sulfide and soluble sulfides like ($Na_2S$).
13. Sulfites, thiosulfates, hydrosulfites, and $SO_2$.

Some inhibitors are effective with respect to certain oxidizing enzymes, for example oxalacetic acid, nicotinic acid amide, iodoacetic acid, pyruvic acid.

Considerable attention has been given in the past to the subject of enzyme inhibitors, and the substances effective for this purpose are mentioned in the literature. It will be understood, however, that the use of agents exerting a detrimental effect on the protein should be avoided, and in general, I prefer the less rigorous enzyme inhibitors. An enzyme inhibitor may be defined as any substance which interferes with or retards the chemical reaction normally occurring as the result of the presence of an enzyme. Consequently, the inhibitor may be a compound which combines with either the portion or the prosthetic group of the enzyme to render the same inactive, or in some instances it may combine with both groups. Other substances may inhibit enzyme activity by removing the substrate, or the material upon which the enzyme acts. Thus I may employ reducing agents to remove the substrate peroxide. Prolonged heating destroys the enzyme, but is undesirable because of the adverse effect on the protein.

I prefer to employ sodium hydroxide to precipitate the protein from the extracting solution, but I have successfully used other alkali metal hydroxides and ammonia. Any other agent, capable of raising the pH value to the extent necessary to precipitate the protein, may be used, the practice of the invention not being dependent upon the use of any particular agent. In fact, I may employ other methods, not involving the use of an alkaline agent, to precipitate the protein. Thus I may heat the solution under vacuum to decompose the bisulfite to an extent sufficient to bring the solution to the isoelectric point.

My process is especially effective as applied to protein derived from soybean, but the improvement in other vegetable materials, for instance protein substances obtained from the peanut or the cottonseed, is also quite evident even from cursory visual inspection. The following examples indicate the nature of the results achieved with the use of various blanketing agents, with or without enzyme inhibitors, a photoelectric reflection meter being used to measure the color of the dry protein samples. This instrument gives readings which may be described in tri-stimulus terms. Three filters, amber (A), blue (B), and green (G), are used. The combination of object with light bulb, filters and photocell of the apparatus is optically "equivalent" to the stimuli which the average eye receives from the object in question. Thus from the readings of the meter and the application of a few simple formulae the color of a solid substance can be established objectively. For the present purpose, a suitable description of color can be established by determining luminance and "yellowness". Because the samples showed a yellow hue of practically identical dominant wave length, "yellowness" as described by Hunter in National Bureau of Standards Circular C-429 is an effective way of determining the actual amount of color present in the sample.

Luminance, often called apparent brightness, is the percentage of visual radiant energy incident on the sample that is transmitted. This is essentially the "gray" value of the sample, the percentage of light reflected back to the eye independent of any color. Perfect white has a luminance of 100%; perfect black 0%.

"Yellowness" is calculated as follows:

$$J = \text{yellowness} = \frac{A-B}{G}$$

For a white or perfectly gray surface $J=0$; the more strongly colored a yellow substance is, the higher will be the value of $J$. For bluish colors this value becomes negative.

In the accompanying chart, therefore, the green filter reading shows the "apparent brightness" or "gray" value of the sample much as the human eye would detect this quality. The yellowness value is a measure of the amount of actual color (yellow) present. In order to secure reproduceable readings the protein samples are all ground to the same mesh size of −48 to +65. The samples which have the highest G reading, and yellow values closest to zero, are the whitest.

The reference in the chart to accompanying example numbers indicates that the sample was prepared in accordance with the correspondingly numbered of the foregoing examples. For the purpose of comparison, commercial milk casein and commercial soybean protein are evaluated.

*Reflectance values of protein extracted by alkaline earth bisulfites*

| Example | Green Filter | Amber Filter | Blue Filter | $\frac{\text{Amber-Blue}}{\text{Green}}$ = Yellowness |
|---|---|---|---|---|
| II | 78.0 | 80.2 | 64.0 | 0.208 |
| III | 64.8 | 68.2 | 46.0 | 0.342 |
| IV | 81.5 | 74.1 | 82.4 | 0.102 |
| V | 61.2 | 65.5 | 41.8 | 0.387 |
| VI | 87.4 | 82.4 | 88.5 | 0.070 |
| VII | 64.0 | 68.0 | 44.2 | 0.372 |
| VIII | 61.5 | 65.5 | 43.8 | 0.333 |
| IX | 85.1 | 86.1 | 78.7 | 0.087 |
| X | 62.5 | 66.1 | 45.2 | 0.334 |
| Commercial Milk Casein | 67.4 | 44.2 | 72.9 | 0.426 |
| Commercial Soybean Protein | 56.8 | 35.0 | 62.3 | 0.480 |

If a blanketing agent which is heavier than water is used, care must be taken not to remove the agent during centrifuging; if the blanketing agent is relatively non-volatile, it may be necessary to extract it after the protein is dried. Suitable variations in procedure such as these will readily be made by those skilled in the art.

The amount of the blanketing agent employed is not critical and may vary widely. It must, of course, be present in amount sufficient to perform the intended purpose, but need not be employed in quantities substantially in excess of that amount. The number of agents which are suitable for the purpose is so large that it is not feasible to recite percentage ranges in each instance, but suitable proportions are indicated by the foregoing specific examples. The natural oil of the seed material may be used as a blanketing agent.

The amount of bisulfite employed must, of course, be sufficient to dissolve the protein, but may vary considerably with different raw materials. A mixture of bisulfites of several of the metals of group II may be used. While I prefer to form the bisulfites in the extracting bath, as indicated in the examples, this is not essential.

Having thus described the invention, what is claimed as new and desired to be secured by Letters Patent is:

1. A method of minimizing the formation of color in protein during isolation from oleaginous seed materials which includes the steps of treating the material with an aqueous solution of a bisulfite of a metal of group II of the periodic table at a pH not greater than 3.0 to dissolve the protein and to inhibit enzyme activity, precipitating the dissolved protein with an alkaline agent, filtering and drying the precipitate, and introducing in effective amount, and in amount substantially in excess of the amount soluble in the aqueous medium, during the isolation process and prior to the drying of the protein a blanketing agent comprising a liquid organic compound having low solubility in water, and capable of forming an adsorption compound with protein to exclude oxygen from contact with the protein molecule.

2. A method of isolating a substantially colorless protein from oleaginous seed materials, which includes the steps of treating the material with an aqueous solution of a bisulfite of a metal of Group II of the Periodic Table at a pH not greater than 3.0 to dissolve the protein and to inhibit enzyme activity, adjusting the pH of the solution to the isoelectric point to precipitate the protein, filtering the precipitate, and introducing in effective amount, and in amount substantially in excess of the amount soluble in the aqueous medium, during the isolation process a blanketing agent comprising a liquid organic compound having low solubility in water, and capable of forming an adsorption compound with protein to exclude oxygen from contact with the protein molecule.

3. The method of claim 2 in which the oleaginous seed material is soybean.

FRANCIS E. CALVERT.

REFERENCES CITED

The following references are of record in the file of this patent:

UNITED STATES PATENTS

| Number | Name | Date |
|---|---|---|
| 1,794,105 | David et al. | Feb. 24, 1931 |
| 2,132,434 | Rauer et al. | Oct. 11, 1938 |
| 2,194,835 | Nickerson | Mar. 26, 1940 |
| 2,331,619 | Morse | Oct. 12, 1943 |